United States Patent [19]
Bell

[11] Patent Number: 6,011,266
[45] Date of Patent: Jan. 4, 2000

[54] APPARATUS AND METHOD FOR THE SIMULTANEOUS DETECTION OF NEUTRONS AND IONIZING ELECTROMAGNETIC RADIATION

[75] Inventor: Zane W. Bell, Oak Ridge, Tenn.

[73] Assignee: Lockheed Martin Energy Research Corporation, Oak Ridge, Tenn.

[21] Appl. No.: 09/060,900

[22] Filed: Apr. 15, 1998

[51] Int. Cl.[7] .................................................. G01T 1/202
[52] U.S. Cl. ................................ 250/390.01; 250/269.2; 250/483.1
[58] Field of Search ........................... 250/390.01, 269.2, 250/483.1

[56] References Cited

U.S. PATENT DOCUMENTS

| | | |
|---|---|---|
| 4,829,185 | 5/1989 | Cerff . |
| 4,883,956 | 11/1989 | Melcher et al. . |
| 5,162,095 | 11/1992 | Alegre et al. . |
| 5,231,290 | 7/1993 | Czirr et al. . |
| 5,659,177 | 8/1997 | Schulte et al. . |

OTHER PUBLICATIONS

Radiation Detection and Measurement, Glenn F. Knoll, John Wiley & Sons, 1989 p. 483, 523, 551.

*Primary Examiner*—Constantine Hannaher
*Assistant Examiner*—Andrew Israel
*Attorney, Agent, or Firm*—Nexsen Pruett Jacobs & Pollard

[57] ABSTRACT

A sensor for simultaneously detecting neutrons and ionizing electromagnetic radiation comprising: a sensor for the detection of gamma radiation, the sensor defining a sensing head; the sensor further defining an output end in communication with the sensing head; and an exterior neutron-sensitive material configured to form around the sensing head; wherein the neutron-sensitive material, subsequent to the capture of the neutron, fissions into an alpha-particle and a $^7$Li ion that is in a first excited state in a majority of the fissions, the first excited state decaying via the emission of a single gamma ray at 478 keV which can in turn be detected by the sensing head; and wherein the sensing head can also detect the ionizing electromagnetic radiation from an incident radiation field without significant interference from the neutron-sensitive material. A method for simultaneously detecting neutrons and ionizing electromagnetic radiation comprising the steps of: providing a gamma ray sensitive detector comprising a sensing head and an output end; conforming an exterior neutron-sensitive material configured to form around the sensing head of the detector; capturing neutrons by the sensing head causing the neutron-sensitive material to fission into an alpha-particle and a $^7$Li ion that is in a first excited state in a majority of the fissions, the state decaying via the emission of a single gamma ray at 478 keV; sensing gamma rays entering the detector through the neutron-sensitive material; and producing an output through a readout device coupled to the output end; wherein the detector provides an output which is proportional to the energy of the absorbed ionizing electromagnetic radiation.

18 Claims, 2 Drawing Sheets

APPARATUS AND METHOD FOR THE SIMULTANEOUS DETECTION OF NEUTRONS AND IONIZING ELECTROMAGNETIC RADIATION

STATEMENT AS TO RIGHTS TO INVENTIONS MADE UNDER FEDERALLY SPONSORED RESEARCH AND DEVELOPMENT

The U.S. Government has certain rights in this invention pursuant to contracts numbers DE-AC05-96OR22464 and DE-AC05-84OR21400, between the United States Department of Energy and Lockheed Martin Energy Services, Incorporated.

BACKGROUND OF THE INVENTION

The present invention relates generally to an apparatus for and method of measuring multiple physical properties associated with the nondestructive assay of nuclear materials. Specifically, the present invention is directed to an apparatus for and method of simultaneously detecting neutrons and ionizing electromagnetic radiation with a single sensing head.

The nondestructive assay of nuclear materials involves the measurement of multiple physical properties of specimens. The ability to take such measurements is particularly important with respect to health physics departments, nuclear materials safeguards and nuclear nonproliferation arenas.

Radioactive materials produce a characteristic gamma ray spectrum from whose analysis the distribution of isotopes may be determined. Gamma ray spectra are typically obtained with high purity germanium detectors or with inorganic scintillator crystals such as sodium iodide. In the cases of isotopes that decay via spontaneous fission, measurement of the neutron production is also performed.

The present art provides neutron detecting devices and/or gamma ray spectrometers in two separate instruments. The subject invention provides neutron and gamma ray sensitivity in a single detector thereby reducing the number of instruments required for nondestructive assay.

Clearly there is room for improvement in the art.

SUMMARY OF THE INVENTION

Therefore, it is an object of the present invention to provide an apparatus and a method for detecting neutrons and gamma rays in a single sensing head.

It is a further object of the present invention to provide an apparatus and a method for performing gamma ray spectroscopy while simultaneously obtaining a neutron signature.

It is a further object of the present invention to provide an apparatus and a method for measuring the 478 keV $^7$Li de-excitation gamma ray as the indicator of the presence of neutrons.

These and other objects are achieved in a first aspect of the present invention by an apparatus for simultaneously detecting neutrons and ionizing electromagnetic radiation. The apparatus comprises: a sensor for the detection of gamma radiation, the sensor defining a sensing head; the sensor further defining an output end in communication with the sensing head, and an exterior neutron-sensitive material configured to form around the sensing head; wherein the neutron-sensitive material, subsequent to the capture of the neutron, fissions into an alpha-particle and a $^7$Li ion that is in a first excited state in a majority of the fissions, the first excited state decaying via the emission of a single gamma ray at 478 keV which can in turn be detected by the sensing head; and wherein the sensing head can also detect the ionizing electromagnetic radiation from an incident radiation field without significant interference from the neutron-sensitive material.

These and other objects are achieved in a second aspect of the present invention by a method for simultaneously detecting neutrons and ionizing electromagnetic radiation. The method comprises the steps of: providing a gamma ray sensitive detector comprising a sensing head and an output end; conforming an exterior neutron-sensitive material configured to form around the sensing head of the detector; capturing neutrons by the sensing head causing the neutron-sensitive material to fission into an alpha-particle and a $^7$Li ion that is in a first excited state in a majority of the fissions, the state decaying via the emission of a single gamma ray at 478 keV; sensing gamma rays entering the detector through the neutron-sensitive material; and producing an output through a readout device coupled to the output end; wherein the detector provides an output which is proportional to the energy of the absorbed ionizing electromagnetic radiation.

BRIEF DESCRIPTION OF THE DRAWINGS

The features of the present invention will become apparent to those skilled in the art to which the present invention relates from reading the following specification with reference to the accompanying drawings in which.

DETAILED DESCRIPTION OF THE PREFERRED EMBODIMENTS

Figure 1:
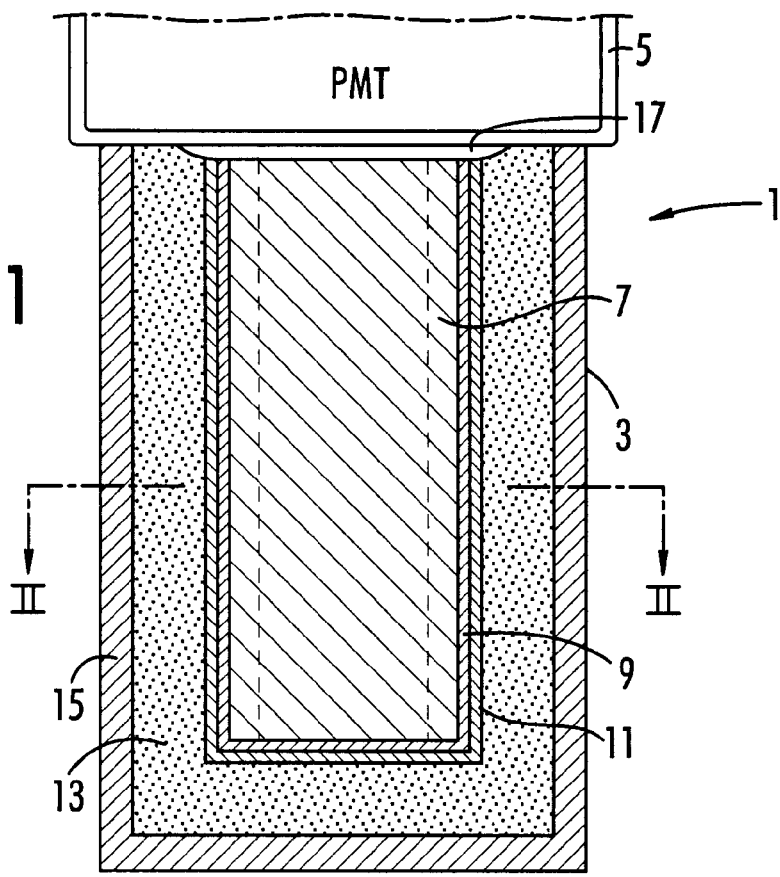
FIG. 1 is a sectional view of a first embodiment of a sensor in accordance with this invention.
Figure 2:
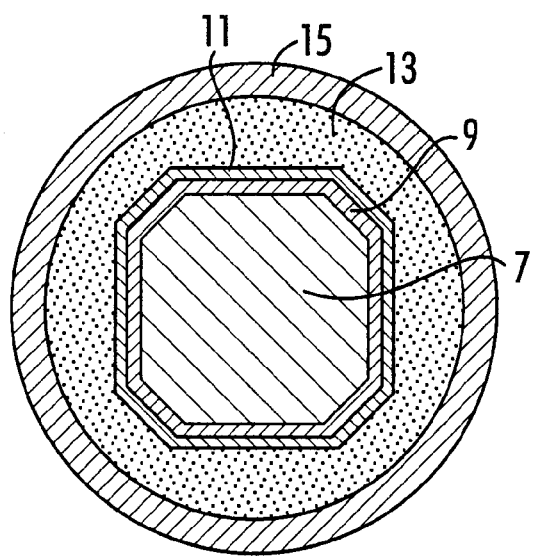
FIG. 2 is a sectional view taken along line II—II of the sensor seen in FIG. 1.

As best seen in reference to FIGS. 1 and 2 (not to scale), a sensor 1 is provided having a sensor head 3 connected to a read-out device 5 seen here as a photo-multiplier tube. The sensor head 3 comprises a scintillator material 7 such as a cadmium tungstate crystal. It is known in the art to cover the crystal with a reflective tape, foil, paper, powder, or paint to prevent loss of scintillation light through the surface of the crystal.

A thin layer of a neutron sensitive material 9 is provided surrounding the scintillator material 7. The neutron sensitive material 9 may be any variety of boron-rich material including fused elemental boron, boron-nitride, boron-carbide, boron-oxide, aluminum borides, and carboranes. Boride material containing heavy metals is not preferred in that the heavy metals may absorb low energy gamma-rays.

An optional shielding layer 11 is seen as a thin layer of low-energy gamma-ray absorber, such as a lead sheet, external to the boron layer 9. This optional layer provides screening against low-energy gamma-rays, i.e., below 1 MeV in situations where the low energy rays would contaminate the desired spectrum. A hydrogenous moderator 13 can be provided of a material such as paraffin or polyethylene to favor the detection of fast and epithermal neutrons. The size and shape of the moderator 13 can be selected so that the resulting detector will be sensitive to particular band energies in the spectrum of incident neutrons. It is realized that the use of any moderator material will lower the efficiency of the detector.

As further seen in FIGS. 1 and 2, a neutron shield 15 can be provided which is designed to be removably inserted over the sensing head 3. The shield 15 may be provided by a $^6$Li-containing shield which will render the sensing head 3 insensitive to neutrons. With shield 15 in place, the detector functions as a gamma-ray detector only.

Sensing head 3 is attached to the photo-multiplier tube 5 by an optical cement or grease 17, the use of which is well-known within the art.

In a preferred embodiment, as seen in FIG. 1, the invention consists of the juxtaposition of thin layers of neutron-sensitive material 9, preferably boron-rich material, and a sensor 1 comprising a sensor head 3 whose output is proportional to the energy of absorbed gamma rays.

The sensor 1 also comprises a scintillator material 7 which may be any variety of gamma ray detector capable of providing energy information. As seen in FIG. 2, the output end 15 of the gamma ray detector 3 remains uncovered by the neutron sensitive material 1 so that the sensor 1 output end 15 may be coupled to a readout device 5 such as an amplifier or a photo-sensor.

Figure 3:
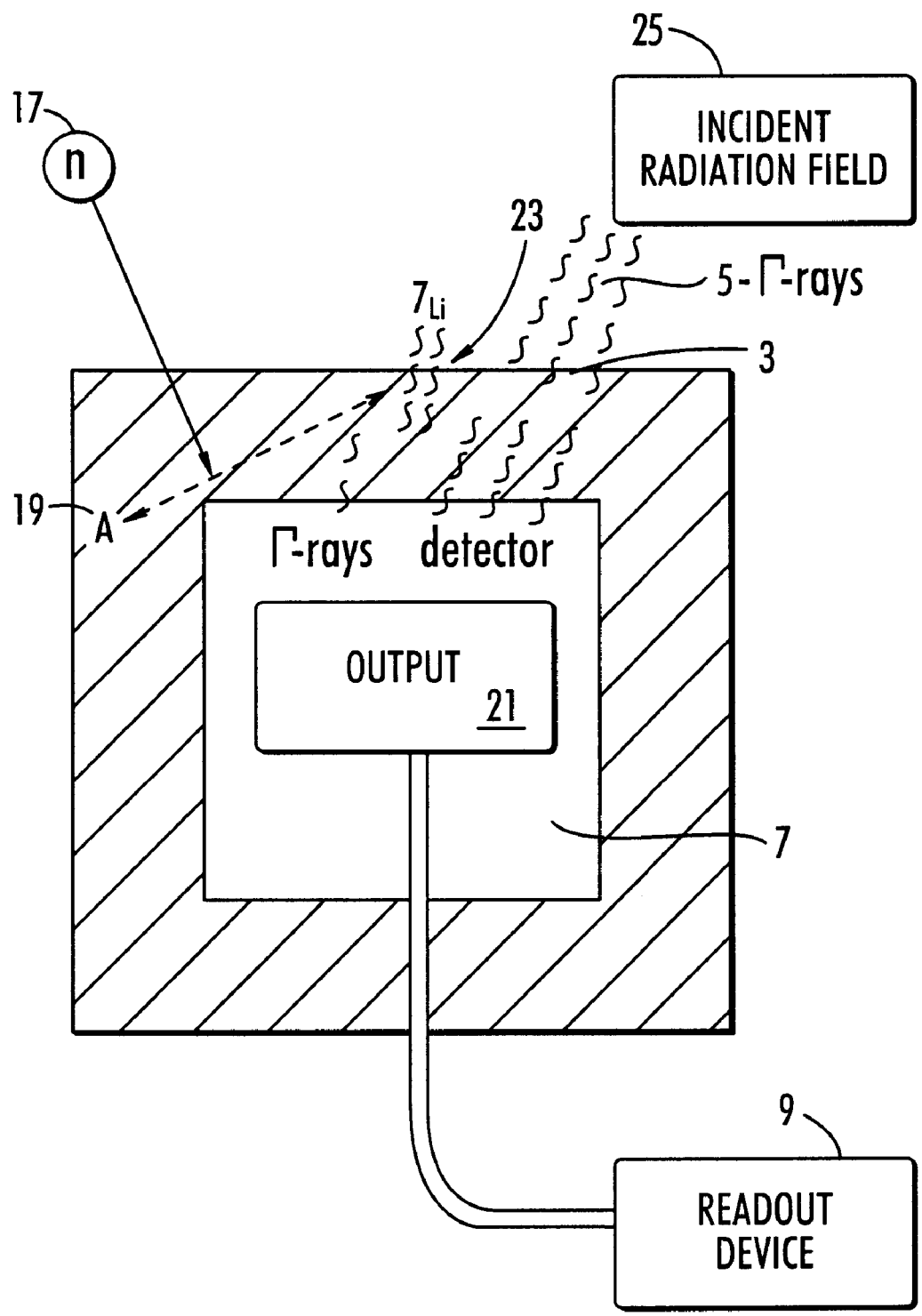
FIG. 3 is a schematic view of a sensor and process for carrying out the invention.

As seen in FIG. 3, the sensor 1 works as a thermal neutron detector by virtue of the fact that upon capture of a thermal neutron 17, the boron in the neutron-sensitive material 9 fissions into an alpha-particle 19 and a $^7$Li ion 21 that is in its first excited state in a majority of the fissions, that is approximately 94% of the fissions. This state decays via the emission of a single gamma ray 23 with energy 478 keV. Since all the boron in the neutron-sensitive material 9 is essentially at the surface of the sensor 1, approximately half of all the 478 keV gamma rays 23 enter the sensor 1 where they are detected.

As seen in FIG. 3, the sensor 1 also works as a gamma ray spectrometer because the thin layers of neutron-sensitive material 9, which are typically 1–2 mm thick, are insufficient to absorb significant numbers of gamma rays that might be present from an incident radiation field 25, and does not affect the spectrum seen by the sensor 1.

The resulting spectrum produced by the sensor 1 contains peaks attributable to gamma rays in the incident radiation field 25 and a single peak at 478 keV attributable to the presence of neutrons 17. Determination of the numbers of distinct gamma rays and neutrons 17 is made from an analysis of the spectrum, by standard means known in the art that yield backgrounds, peak areas, and peak energies. From a knowledge of the expected gamma rays from a sample taken under test, the isotopes present in that sample may be determined. In addition, the number of neutrons may be found from an analysis of the peak (if any) in the spectrum at 478 keV.

The gamma ray detector housing the scintillator material 7 may be any of several types. If it is desired to do precise analysis of the incident gamma ray field spectrum, then high-purity germanium may be used. If medium resolution analysis is required, then an inorganic scintillating crystal is the appropriate choice. If only gross radiation needs to be measured, then a plastic scintillator or a gas-filled (xenon or argon, for example) tube are reasonable choices.

The opacity of the gamma ray detector must also be considered when its selection is made. If it is desired to distinguish neutrons from gamma rays, efficient detection of the 478 keV gamma ray is required. Gamma ray detectors constructed with materials with low atomic numbers, such as silicon, germanium or plastic, must be at least several centimeters thick. Inorganic scintillating crystals, such as sodium iodide, cadmium tungstate, or bismuth germinate need only be 1 to 3 cm thick.

The neutron-sensitive material 9 may be any boron-containing material that may be formed around the scintillator material 7 in a thin layer. Although it is not necessary for the boron layer to be thin, it is extremely advantageous because the efficiency with which the sensor 1 will detect neutrons depends on the probability that the 478 keV gamma ray 23 enters the scintillator material 7 of the gamma ray detector. This probability is largest for thin layers.

Thus, there has been described and illustrated herein methods and apparatus in the simultaneous detection of neutrons and ionizing electromagnetic radiation. While particular embodiments of the invention have been described, it is not intended that the invention be limited thereby. Therefore, it will be apparent to those skilled in the art that various changes and modifications may be made to the invention as described without departing from the spirit and scope of the appended claims.

We claim:

1. A sensor for simultaneously detecting neutrons and ionizing electromagnetic radiation comprising:

a sensor head defining a gamma ray detector; said sensor head further defining:

an output end in communication with a readout device; and an exterior boron-rich material forming a neutron-sensitive material configured to form around said sensor head;

wherein said neutron-sensitive material, subsequent to the capture of said neutrons, fissions into an alpha-particle and a $^7$Li ion that is in a first excited state in a majority of the fissions, said first excited state decaying via the emission of a single gamma ray at 478 keV which can in turn be detected by said sensor head; and wherein said sensor head can also detect said ionizing electromagnetic radiation from an incident radiation field without significant interference from said neutron-sensitive material.

2. The sensor according to claim 1 wherein said output end is coupled to a readout device, wherein said readout device provides an amplitude spectrum of outputs indicating the number of said neutrons, measured as gamma rays at 478 keV, and the number of said gamma rays from said incident radiation source.

3. The sensor according to claim 2 wherein said readout device is a photo-sensor.

4. The sensor according to claim 2 wherein said readout device is in further communication with an amplifier.

5. The sensor according to claim 1 wherein said neutron-sensitive material is a boron-rich material having a thickness between 1–2 mm.

6. The sensor according to claim 1 wherein said gamma ray detector further comprises a high-purity germanium detector.

7. The sensor according to claim 1 wherein said gamma ray detector is an inorganic scintillating crystal.

8. A method for simultaneously detecting neutrons and ionizing electromagnetic radiation comprising the steps of:

providing a gamma ray sensitive detector comprising a sensing head and an output end;

conforming an exterior boron-rich material configured to form around said sensing head of said detector;

capturing neutrons by said sensing head causing said boron-rich material to fission into an alpha-particle and a $^7$Li ion that is in a first excited state in a majority of the fissions, said state decaying via the emission of a single gamma ray at 478 keV;

sensing gamma rays, including said gamma rays at 478 keV, entering said sensing head through said boron-rich material; and producing an output through a readout device coupled to said output end; wherein said detector provides an output which is proportional to the energy of the absorbed ionizing electromagnetic radiation.

9. The method according to claim 8 wherein said step of producing an output through a readout device coupled to said output end further comprises producing an amplitude spectrum of outputs indicating the number of said neutrons, measured as gamma rays at 478 keV, and the number of said gamma rays from said incident radiation source.

10. The method according to claim 9 wherein said readout device is a photo-sensor.

11. The method according to claim 9 wherein said readout device is in communication with an amplifier.

12. The method according to claim 8 wherein said neutron-sensitive material is a boron-rich material.

13. The method according to claim 8 wherein said detector comprises a high-purity germanium detector.

14. The method according to claim 8 wherein said detector comprises an inorganic scintillating crystal.

15. A sensor head for the detection of gamma radiation and thermal neutrons, comprising:

a sensor head, said sensor head comprising a thin layer of boron-rich material forming a neutron sensitive material, said boron-rich material surrounding the free surfaces of a gamma ray sensitive scintillation material;

a readout device coupled to a transmitting surface of said scintillation material, said readout device detecting spectra transmitted through said transmitting surface;

wherein said sensor detects said thermal neutrons via boron fission derived $^7$Li de-excitation gamma rays at 478 keV while simultaneously detecting non-boron fission derived gamma rays which occur at different energy levels.

16. The sensor according to claim 15 wherein said sensor head further comprises a low energy gamma ray shield surrounding said scintillation material.

17. The sensor according to claim 15 wherein said sensor head further comprises a hydrogenous moderator layer positioned external to said neutron sensitive material.

18. A sensor according to claim 15 wherein a neutron shield surrounds an exterior of said sensor head.

* * * * *